United States Patent Office 3,429,952
Patented Feb. 25, 1969

3,429,952
HIGH TEAR STRENGTH POLYBUTADIENE VULCANIZATES
Karl-Heinz Nordsiek and Horst Brinkmann, Marl, Germany, assignors to Chemische Werke Huls A.G., Marl, Germany
No Drawing. Filed Aug. 18, 1966, Ser. No. 573,202
Claims priority, application Germany, Sept. 1, 1965, C 36,782
U.S. Cl. 260—894                10 Claims
Int. Cl. C08d 9/00, 9/08

ABSTRACT OF THE DISCLOSURE

Tear resistance of cis polybutadiene is improved by blending therewith a salt of a copolymer of butadiene or isoprene and an unsaturated carboxylic acid.

---

Applicants hereby claim the benefit of the filing date of Western German application Ser. No. C 36,782 filed Sept. 1, 1965.

This invention relates to the production of polybutadiene vulcanizates having special copolymers incorporated therein for improving the properties, especially the tear strength, of the final products.

The processing of rubbery mixtures with conventional equipment is still troubled by a number of unsolved problems. These problems are particularly accentuated when the rubbery mixture comprises polybutadienes having a high cis-content.

The difficulties encountered with polybutadiene vulcanizates are caused mostly by a lack of inherent adhesiveness, an unsatisfactory building tack of filled raw rubber, a poor mixture plasticity and a poor extrudability. Consequently, only blends of cis-1,4-polybutadiene with either natural rubber, or with styrenebutadiene rubber are known to be processed in an economical and utilitarian manner. However, in such cases the outstanding properties of the high-cis-containing polybutadiene are deleteriously affected.

Moreover, it is known in particular that vulcanizates of cis-1,4-polybutadiene which are reinforced with carbon black do not exhibit sufficient resistance against crack widening during use. This deficiency, which is called resistance against further tears, or tear resistance, causes the "chipping and chunking" phenomena which occur, to a large extent in automobile tires, particularly truck tires, made of polybutadiene.

An object of this invention, therefore, is to provide vulcanizates based on polybutadiene, which vulcanizates are relatively easy to process on the one hand, and offer improved properties on the other. In this connection specific objects include novel vulcanizable and vulcanized compositions as well as novel processes and intermediates for producing such compositions.

Upon further study of the specification and claims other objects and advantages of the present invention will become apparent.

For the attainment of the objects of this invention, there is added to the polybutadiene, its copolymers, or to blends containing polybutadiene, about 1 to 30% by weight, preferably 2 to 15% by weight, of a copolymerizate of butadiene or isoprene and an unsaturated carboxylic acid of 3 to 10 carbon atoms, which copolymerizate contains, per 100 chain carbon atoms, 1 to 20 carboxyl groups which are substantially (at least 40%), if not completely, neutralized. The thus obtained mixture is vulcanized in a conventional manner. The ranges of 1–30%, and 2–15% are based on particular salts (column 2, lines 52–57). A great number of unneutralized carboxyl groups leads, as expected, to an extreme retardation of vulcationsation.

Polybutadienes whose processability and vulcanizing properties are most markedly improved by the present invention are polybutadienes having a high cis-content, i.e., having proportions of the cis-1,4-configuration of, for example, 30–100%, particularly over 90% (commercial product 94–98% cis). All other butadiene polymers produced by diverse processes can also be treated, for example, copolymerizates of butadiene and styrene. Polybutadiene copolymerized with synthetic and natural polyisoprenes are also amenable to the treatment.

In this connection, it is of no import whether these products are produced by emulsion or by solution polymerization whether it be in the presence of alkali metals, organometallic compounds, or Redox systems.

In the same manner, blends can also be produced. In this connection, particularly suitable are blends of polybutadienes with certain other rubbers, in particular butadiene-styrene rubber (it being of no consideration whether these were produced by Redox systems or by means of organometallic compounds in solution, or synthetic polyisoprene, and preferably natural rubber. In such cases the weight proportion of the polybutadiene to the other rubber is 95:5 to 5:95, respectively.

Hereinafter the expression "polybutadiene" is intended to cover all of the precedingly described homopolymers, copolymers and blends, as well as the obvious chemical equivalents thereof.

The copolymerizates of butadiene and an unsaturated carboxylic acid of 3 to 10 carbon atoms to be used according to the invention can, on the one hand, be produced by copolymerizing butadiene or isoprene with unsaturated carboxylic acids or the anhydride thereof, or, on the other hand, by graft copolymerizing the acid onto a polybutadiene or polyisoprene backbone.

Preferred unsaturated carboxylic acids of 3–10 carbon atoms are $\alpha$-ethylenically unsaturated hydrocarbon carboxylic acids such as acrylic acid, methacrylic acid, fumaric acid, maleic acid, crotonic acid, citraconic acid, itaconic acid.

The reaction of the starting components themselves is conducted under the conditions of free radical polymerization, wherein the copolymerization is carried out up to a content of 1–20, preferably 1–10 carboxyl groups per 100 chain carbon atoms (depending upon the starting proportion of butadiene to unsaturated acid). The molecular weight of the thus-obtained copolymerizates preferably ranges between 20,000 and 500,000.

The thus-introduced carboxyl groups are finally neutralized by alkaline media to form salts of such copolymers. Preferred alkaline media are alkali metal, or alkaline earth metal, hydroxides, carbonates, and oxides; additionally suitable are also the corresponding compounds of aluminum and zinc. For economic purposes the preferred alkali metals and alkaline earth metals include sodium, potassium, magnesium, calcium and barium.

The neutralization can be conducted, for example, in such a manner that the solution of the copolymer in an organic solvent is treated for an extended period of time, under vigorous agitation, with an aqueous solution of a metallic hydroxide, preferably an alkaline earth metal hydroxide, the resultant products being subsequently precipitated by methanol. On the other hand, it is also possible to precipitate the aqueous emulsion of the copolymer with the stoichiometric quantity of a metallic hydroxide dissolved in water. Finally, it is often sufficient if the alkaline medium is homogeneously distributed, which medium does not necessarily have to be water-soluble in such a case, in the solution or emulsion of the copolymer. Here, the formation of the salt does not take place until the subsequent conventional process steps have been commenced. It is thus also possible for the alkaline compound to be added to the rubber mixture on the rolling mill, or in the internal mixer.

The addition of the above-described copolymers can be done before the polybutadiene rubber is processed, by adding to the solution or emulsion, or it can be done later by adding the same on the mill or in the internal mixer. The conventional process steps following this addition are the same as would be without said additions.

The quantities of these copolymerizates to be added are 1-30% by weight, preferably 2-15% by weight, based on the provided proportion of untreated polybutadiene rubber. Moreover, these mixtures can have added thereto 2-100 parts by weight, preferably 5-50 parts by weight, of oil extender, based on the polybutadiene rubber employed, without significantly impairing the advantageous properties of the vulcanizates. These oils can be paraffinic, naphthenic, or aromatic oils.

When carbon black is used as filler and/or reinforcing agent, the content thereof can beneficially amount to 30-120, preferably 40-70 parts by weight, based on the rubber quantity (i.e. total polymer content). Also, fillers of other conventional types are usable under the same conditions.

The vulcanization of the above-described mixtures is conducted in a conventional manner. All sulfur-accelerator systems can be used, without limitation; the proportions of these systems are to be based on the particular rubber and copolymerizates employed. Furthermore, other vulcanization techniques, such as cross-linking with peroxides, or the resin vulcanization process, can be used, as is conventional, the same success being achieved. A vulcanizing amount of any vulcanizing agent can thus be employed.

The vulcanizates which can be produced according to the present process have a considerably increased tear resistance, particularly in case of homopolymers of butadiene having a high cis-content, as well as in case of blends wherein such homopolymers are contained in large proportions. Even with the addition of only 2-5% by weight of the copolymeric salts of this invention, the values are markedly raised; when adding 10 parts, gains in the range of more than 100% are observed. All other properties, including the elasticity, are subjected to only minor changes.

In addition to the improvement in the plasticity of the raw mixture associated properties are also benefitted, thereby facilitating such operations as milling, kneading, calendering, and extruding. The favorable influence upon extrudability becomes more and more noticeable with increased amounts of the copolymeric salts, and in the case of polybutadienes, the beneficial effect on flow is highly pronounced. The resultant molded product has a smoother surface and a greater uniformity. The plasticities of such mixtures are always considerably lower than those of the comparative samples, i.e., of those polybutadiene mixtures which have no such copolymerizates added thereto. Also the improvement of the building tack can be clearly proven by a simple manual test.

The vulcanizates produced in this manner can be employed most advantageously in the manufacture of tires, particularly truck tires, as well as in the manufacture of other rubber articles wherein a high tear resistance is desired.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE (I) 4,670 g. xylene, 1,800 g. butadiene, 200 g. acrylic acid, 20 g. t-dodecylmercaptan, and 10 g. di-t-butyl peroxide are subjected to a controlled free radical copolymerization at 120° C. for a reaction period of 50 hours. To this solution a stoichiometric quanity of $Ba(OH)_2$ is added and stirred 5 hours/50° C., precipitated with methanol and dried in vacuum.

(II) Production of the rubber mixture.

Recipe

Cis-polybutadiene _____ 100.00 parts by weight.
Copolymerizate of (I) _____ Variable amounts, according to the table.
HAF (High abrasion furnace):
   Carbon black _____ 50.00 parts by weight.
   Stearic acid _____ 2.00 parts by weight.
   ZnO _____ 3.00 parts by weight.
   Phenyl-β-naphthylamine ____ 1.00 parts by weight.
   Aromatic oil _____ 8.00 parts by weight.
   Sulfuric _____ 2.00 parts by weight.
   N - cyclohexyl-benzothiazyl sulfenamide _____ 0.75 parts by weight.
Heating: 40 minutes at 143° C.

TABLE

| Amt. of copolymer added | Mixture ML-4 | Extrusion test, m./min. | Tensile strength, kg./cm.² | Elongation, percent | Modulus 300%, kg./cm.² | Tear resistance according to— | |
|---|---|---|---|---|---|---|---|
| | | | | | | Pohle, kg./cm. | Graves, kg./cm. |
| | | | | | | | → ↓ |
| Without additive parts | 74 | 1.10 | 135 | 345 | 92 | 11 | 33  34 |
| Plus 2 parts | 70 | 1.21 | 133 | 382 | 90 | 13 | 55  54 |
| Plus 5 parts | 68 | 1.36 | 130 | 392 | 87 | 16 | 68  76 |
| Plus 10 parts | 64 | 1.41 | 145 | 444 | 80 | 19 | 91  99 |

| Amt. of copolymer added | Tested by means of crescent shaped sample | | Permanent elongation, percent | Hardness | Rebound elasticity | | Abrasion DVM, mm.³ | Compression set, 22 h./75° C. |
|---|---|---|---|---|---|---|---|---|
| | → | ↓ | | | 22° C. | 75° C. | | |
| Without additive parts | 53 | 45 | 7 | 62 | 54 | 56 | 40 | 15 |
| Plus 2 parts | 70 | 73 | 6 | 61 | 53 | 54 | 38 | 18 |
| Plus 5 parts | 82 | 85 | 7 | 61 | 52 | 53 | 42 | 18 |
| Plus 10 parts | 98 | 96 | 8 | 61 | 50 | 53 | 40 | 17 |

NOTE.—The effect of the considerably increased tear resistance of cis-1,4-polybutadiene vulcanizates with increasing dosage of the compounds toia used according to the invention can clearly be seen in this table with reference to three different testing methods, without there being any substantl reduction in the other property values.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A vulcanizable composition comprising a blend of polybutadiene having a cis-1,4 content of at least 30% and about 1–30% by weight based on the polybutadiene of a salt of a copolymer of (a) butadiene or isoprene and (b) an unsaturated carboxylic acid of 3 to 10 carbon atoms, the content of the carboxylic acid in said copolymer being such that there are 1–20 carboxyl units per 100 carbon atoms in the copolymeric chain.

2. A composition as defined by claim 1, wherein said salt is an alkali metal or alkaline earth metal salt.

3. A composition as defined by claim 1, wherein the copolymer is present in a concentration of 2–15% by weight.

4. A composition as defined by claim 1, wherein the polybutadiene is a homopolymer of butadiene being at least 90% 1,4-cis in structure.

5. A composition as defined by claim 4, wherein said salt is an alkali metal or alkaline earth metal salt of a copolymer of (a) butadiene and (b) acrylic acid.

6. A high tear strength vulcanized composition comprising a vulcanizing amount of a vulcanizing agent and a blend of polybutadiene having a cis-1,4 content of at least 30% and about 1–30% by weight based on the polybutadiene of a salt of a copolymer of (a) butadiene or isoprene and (b) an unsaturated carboxylic acid of 3 to 10 carbon atoms, the content of the carboxylic acid in said copolymer being such that there are 1–20 carboxyl units per 100 carbon atoms in the copolymeric chain.

7. A composition as defined by claim 6, wherein said salt is an alkali metal or alkaline earth metal salt.

8. A composition as defined by claim 6, wherein the copolymer is present in a concentration of 2–15% by weight.

9. A composition as defined by claim 6, wherein the polybutadiene is a homopolymer of butadiene being at least 90% 1,4-cis in structure and wherein said vulcanizing agent is sulfur.

10. A composition as defined by claim 9, wherein said salt is an alkali metal or alkaline earth metal salt of a copolymer of (a) butadiene and (b) acrylic acid.

References Cited

UNITED STATES PATENTS 3,281,385  10/1966  Gardner et al. _____ 260—29.7
3,245,452   4/1966  Scott _____ 152—330

SAMUEL H. BLECH, *Primary Examiner.*

M. J. TULLY, *Assistant Examiner.*

U.S. Cl. X.R.

260—5, 41.5, 78.5, 82.1, 876, 879